United States Patent
Chen et al.

(10) Patent No.: US 11,194,902 B2
(45) Date of Patent: Dec. 7, 2021

(54) SIDE-CHANNEL ATTACK DETECTION USING HARDWARE PERFORMANCE COUNTERS

(71) Applicant: INTEL CORPORATION, Santa Clara, CA (US)

(72) Inventors: Li Chen, Hillsboro, OR (US); Kai Cong, Hillsboro, OR (US); Salmin Sultana, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 360 days.

(21) Appl. No.: 16/234,085

(22) Filed: Dec. 27, 2018

(65) Prior Publication Data
US 2019/0130096 A1 May 2, 2019

(51) Int. Cl.
*G06F 21/55* (2013.01)
*G06N 20/00* (2019.01)

(52) U.S. Cl.
CPC .......... *G06F 21/552* (2013.01); *G06F 21/554* (2013.01); *G06N 20/00* (2019.01); *G06F 2221/034* (2013.01)

(58) Field of Classification Search
CPC ...... G06F 21/552; G06F 21/554; G06N 20/00
See application file for complete search history.

(56) References Cited

U.S. PATENT DOCUMENTS

| | | | |
|---|---|---|---|
| 9,436,603 B1 * | 9/2016 | Pohlack | G06F 21/556 |
| 10,565,129 B2 * | 2/2020 | Schuster | G06F 12/0806 |
| 2019/0147162 A1 * | 5/2019 | Mejbah Ul Alam | G06F 21/566 726/23 |
| 2019/0340392 A1 * | 11/2019 | Khorrami | G06F 21/52 |

FOREIGN PATENT DOCUMENTS

KR 20160008509 A * 1/2016 ........... G06F 21/566

OTHER PUBLICATIONS

Kocher, Paul, et al., "Spectre Attacks: Exploiting Speculative Execution", 40th IEEE Symposium on Security and Privacy (S&P'19) 2018, 19 pages.
(Continued)

*Primary Examiner* — Ali S Abyaneh
*Assistant Examiner* — Shu Chun Gao
(74) *Attorney, Agent, or Firm* — Alliance IP, LLC

(57) ABSTRACT

The present disclosure is directed to systems and methods of detecting a side-channel attack using hardware counter anomaly detection circuitry to select a subset of HPCs demonstrating anomalous behavior in response to a side-channel attack. The hardware counter anomaly detection circuitry includes data collection circuitry to collect data from a plurality of HPCs, time/frequency domain transform circuitry to transform the collected data to the frequency domain, one-class support vector anomaly detection circuitry to detect anomalous or aberrant behavior by the HPCs. The hardware counter anomaly detection circuitry selects the HPCs having reliable and consistent anomalous activity or behavior in response to a side-channel attack and groups those HPCs into a side-channel attack detection HPC sub-set that may be communicated to one or more external devices.

25 Claims, 8 Drawing Sheets

(56) References Cited

OTHER PUBLICATIONS

Lipp, Moritz et al., "Meltdown", 27th {USENIX} Security Symposium ({USENIX} Security 18), 2018, 16 pages.
Evtyushkin, D., Ponomarev, D. V., and Abughazaleh, N. B., "Jump over ASLR: Attacking branch predictors to bypass ASLR", In MICRO (2016), IEEE Computer Society, Abstract only, 2 pages.
Lee, S. et al., "Inferring fine-grained control flow inside SGX enclaves with branch shadowing", In 26th USENIX Security Symposium, USENIX Security 2017, Vancouver, BC, Canada, Aug. 16-18, 2017. (2017), 19 pages.
Aciic, O. et al., "New Branch Prediction Vulnerabilities in OpenSSL and Necessary Software Countermeasures", In 11th IMA International Conference on Cryptography and Coding (Dec. 2007), S. D. Galbraith, Ed., vol. 4887 of Lecture Notes in Computer Science, Springer, Heidelberg, 16 pages.
Aciic, O. et al., "Predicting Secret Keys via Branch Prediction", In Topics in Cryptology—CT-RSA 2007 (Feb. 2007), M. Abe, Ed., vol. 4377 of Lecture Notes in Computer Science, Springer, Heidelberg, 14 pages.
Gullasch, D., et al., "Cache Games—Bringing Access-Based Cache Attacks on AES to Practice", In 2011 IEEE Symposium on Security and Privacy (May 2011), IEEE Computer Society Press, 16 pages.
Osvik, D. A., et al., Cache Attacks and Countermeasures: The Case of AES, In Topics in Cryptology—CT-RSA 2006 (Feb. 2006), D. Pointcheval, Ed., vol. 3860 of Lecture Notes in Computer Science, Springer, Heidelberg, 25 pages.
Percival, C., Cache Missing for Fun and Profit. Retrieved from http:// www.daemonology.net/papers/htt.pdf, 2005, 13 pages.
Tsunoo, Y., et al., "Cryptanalysis of DES Implemented on Computers with Cache", In Cryptographic Hardware and Embedded Systems—CHES 2003 (Sep. 2003), Springer-Verlag Berline Heidelberg 2003, 15 pages.

\* cited by examiner

| | |
|---|---|
| cpu-cycles | cache-misses |
| inst_retired.any | cache-references |
| mem_inst_retired.all_loads | cycle_activity.cycles_l3_miss |
| mem_load_retired.l3_hit | cycle_activity.stalls_l3_miss |
| mem_load_retired.l3_miss | int_misc.clear_resteer_cycles |
| itlb.itlb_flush | int_misc.recovery_cycles |
| tlb_flush.dtlb_thread | br_inst_retired.conditional |
| tlb_flush.stlb_any | br_misp_retired.conditional |
| rtm_retired.start | br_inst_retired.all_branches_pebs |
| rtm_retired.aborted | br_misp_retired.all_branches_pebs |
| rtm_retired.aborted_memtype | hw_interrupts.received |
| tx_mem.abort_conflict | dtlb_load_misses.miss_causes_a_walk |
| uops_retired.stall_cycles | dtlb_load_misses.walk_completed |
| uops_retired.total_cycles | dtlb_load_misses.walk_pending |

FIG. 3A

SIDE-CHANNEL ATTACK DETECTION USING HARDWARE PERFORMANCE COUNTERS

TECHNICAL FIELD

The present disclosure relates to computer security, specifically the detection and mitigation of side-channel attacks.

BACKGROUND

Side-channel attacks gained widespread notoriety in early 2018. A side-channel attack includes any attack based on information gained from the implementation of a computer system, rather than weaknesses in the implemented algorithm itself. Such side-channel attacks may use timing information, power consumption, electromagnetic leaks or even sound as an extra source of information, that is exploited to obtain information and/or data from the system. Side-channel attacks include Spectre and Meltdown, both of which rely on deducing whether data originates in a cached or un-cached location. To a significant degree, the determination of where data originates relies upon the precise timing of events such as loads from memory space.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 3A is a listing of illustrative candidate HPCs, in accordance with at least one embodiment described herein;

Figure 1:
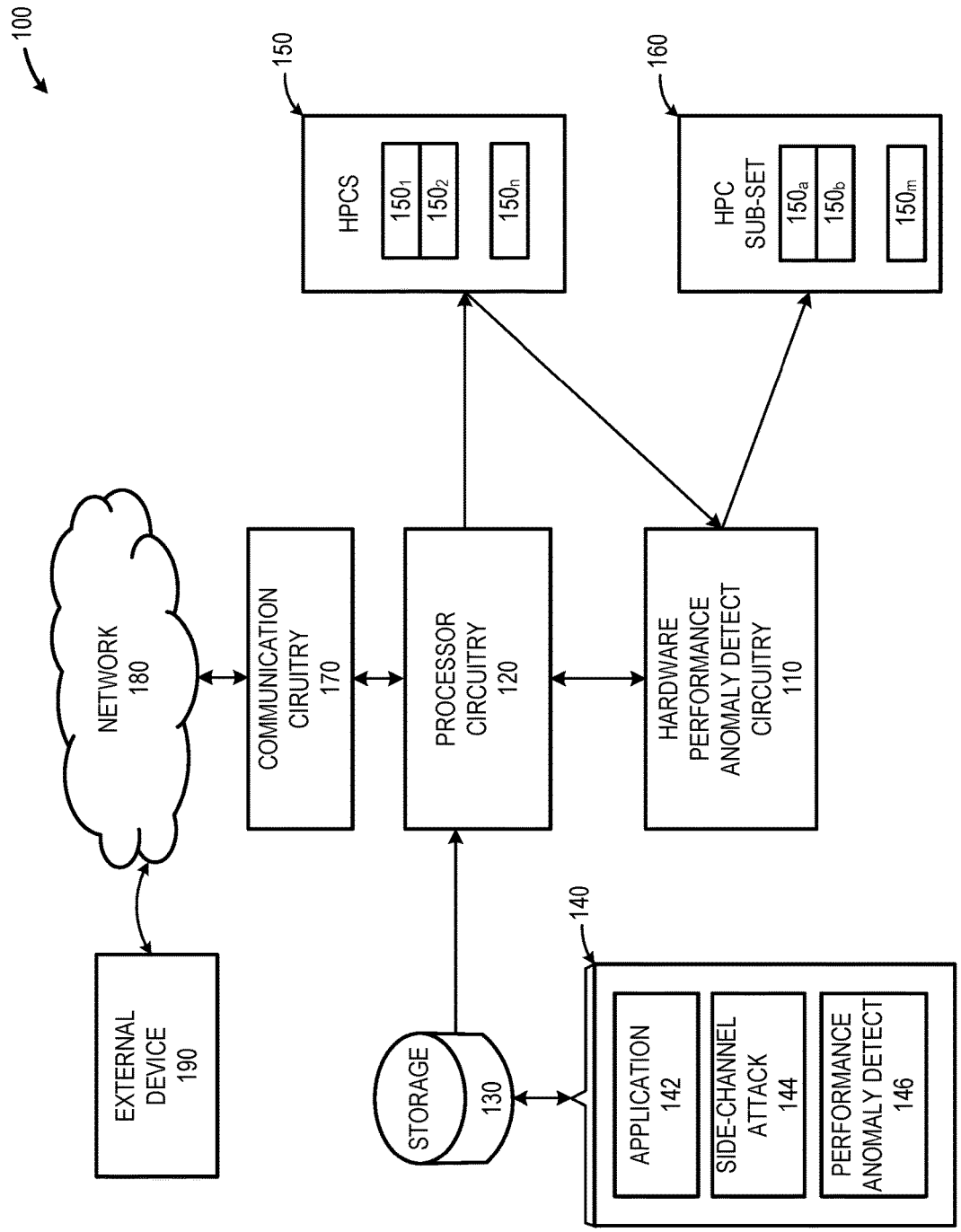
FIG. 1 is a schematic diagram of an illustrative system that includes hardware counter anomaly detection circuitry coupled to processor circuitry, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Many processor based systems include a number of counters useful for monitoring and/or optimizing system performance. With the discovery of side-channel attacks, hardware performance counters (HPCs) have also been found useful for detecting attempts by an attacker to launch a side-channel attack. However, current systems may have a large number of HPCs, which if sampled on a frequent basis may generate a large quantity of data. The systems and methods disclosed herein determine a smaller subset of HPCs that provide a reliable and consistent indication of an attempted side-channel attack on a system. The systems and methods disclosed herein flexibly and adaptably detect each threat or class of threats may be identified, communicated, and used by external systems to detect an occurrence of a side-channel attack.

The systems and methods described herein provide a machine learning algorithm conducts a time-series analysis of HPC data. Based on the analysis, the systems and methods described herein develop anomaly detection models to detect side-channel attacks on processor cache. Beneficially, the systems and methods described herein run as a passive component, use existing system data, and do not require operating system modifications in order to identify attempted side-channel attacks using a set of HPCs selected based on their ability to detect the presence of malicious code execution. Beneficially, the systems and methods described herein are extensible to detect attacks that are not included in the training dataset, thereby providing protection that is resilient against newly evolved side-channel attacks.

The systems and methods described herein employ a machine-learning framework, based on anomaly detection of time-series hardware performance counter data, for run-time detection of processor cache side-channel attacks. The systems and methods described herein (1) collect data generated by hardware performance counters under known conditions (e.g., a processor running one or more applications and the same processor running the one or more applications when under a side-channel attack); (2) extracting features from collected time-series data; (3) use the collected data to train a one-class anomaly detector; and (4) identify the important HPCs (e.g., the HPCs demonstrating distinguishable anomalous behavior over normal application execution).

A side channel attack detection system is provided. The system may include: processor circuitry; a plurality of HPCs coupled to the processor circuitry; hardware performance anomaly detection circuitry; and at least one storage device that includes machine-executable instructions that, when executed by the hardware performance anomaly detection circuitry, cause the hardware performance anomaly detection circuitry to: collect information representative of a side-channel attack dataset for each respective one of a plurality of HPCs as the processor circuitry executes at least one side channel attack detection instruction set; detect whether each of the plurality of HPCs demonstrates anomalous activity as the processor circuitry executes the at least one side-channel attack instruction set; and select the at least one HPC for inclusion in a side-channel attack detection HPC sub-set based on the demonstrated anomalous activity of the respective at least one HPC.

A side channel attack detection method is provided. The method may include: executing, by processor circuitry, at least one side channel attack instruction set; collecting, by hardware performance anomaly detection circuitry coupled to the processor circuitry, information representative of a side-channel attack dataset for each respective one of a plurality of HPCs; detecting, by the hardware performance anomaly detection circuitry, whether each of the plurality of HPCs demonstrates anomalous activity as the processor circuitry executes the at least one side-channel attack instruction set; and selecting, by the hardware performance anomaly detection circuitry, at least one HPC for inclusion in a side-channel attack detection HPC sub-set based on the demonstrated anomalous activity of the respective at least one HPC.

A non-transitory machine-readable storage medium that includes machine-executable instructions is provided. The machine-executable instructions, when executed by hardware performance anomaly detection circuitry coupled to processor circuitry, may cause the hardware performance anomaly detection circuitry to: collect information representative of a side-channel attack dataset for each respective one of a plurality of HPCs responsive to execution of at least one side channel attack instruction set by the processor circuitry; detect whether each of the plurality of HPCs demonstrates anomalous activity as the processor circuitry executes the at least one side-channel attack instruction set; and select at least one HPC for inclusion in a side-channel attack detection HPC sub-set based on the demonstrated anomalous activity of the respective at least one HPC.

A side channel attack detection system is provided. The system may include: means for executing at least one side channel attack instruction set; means for collecting information representative of a side-channel attack dataset for each respective one of a plurality of HPCs; means for detecting whether each of the plurality of HPCs demonstrates anomalous activity as the processor circuitry executes the at least one side-channel attack instruction set; and means for selecting at least one HPC for inclusion in a side-channel attack detection HPC sub-set based on the demonstrated anomalous activity of the respective at least one HPC.

An electronic device is provided. The electronic device may include: a printed circuit board; processor circuitry coupled to the printed circuit board; a plurality of HPCs coupled to the processor circuitry; input/output interface circuitry; and a side-channel attack detection system that includes: hardware performance anomaly detection circuitry; and at least one storage device that includes machine-executable instructions that, when executed by the hardware performance anomaly detection circuitry, cause the hardware performance anomaly detection circuitry to: collect information representative of a side-channel attack dataset for each respective one of a plurality of HPCs as the processor circuitry executes at least one side channel attack detection instruction set; detect whether each of the plurality of HPCs demonstrates anomalous activity as the processor circuitry executes the at least one side-channel attack instruction set; and select the at least one HPC for inclusion in a side-channel attack detection HPC sub-set based on the demonstrated anomalous activity of the respective at least one HPC.

As used herein, the term "processor cache" and "cache circuitry" refer to cache memory present within a processor or central processing unit (CPU) package. Such processor cache may variously be referred to, and should be considered to include, without limitation, Level 1 (L1) cache, Level 2 (L2) cache, Level 3 (L3) cache, and/or last or lowest level cache (LLC).

FIG. 1 is a schematic diagram of an illustrative system 100 that includes hardware counter anomaly detection circuitry 110 coupled to processor circuitry 120, in accordance with at least one embodiment described herein. A storage device 130 stores or otherwise retains processor executable instructions 140. The processor-executable instructions 140 include application instructions 142 and side-channel attack instructions 144. The system 100 also includes a plurality of HPCs $150_1$-$150_n$ (collectively, "HPCs 150") that monitor various system and processor performance characteristics and/or parameters. In operation, the hardware counter anomaly detection circuitry 110 monitors the HPCs 150 as one or more side channel attack instruction sets 144 are executed by the processor circuitry 120. The hardware counter anomaly detection circuitry 110 identifies those HPCs 150 demonstrating a reliably detectable and/or identifiable anomaly in behavior and groups those HPCs 150 into a side-channel attack detection HPC sub-set 160. The HPCs 150 includes in the side-channel attack detection HPC sub-set 160 may be communicated to one or more external devices and/or systems, such as one or more client systems.

The hardware counter anomaly detection circuitry 110 includes any number and/or combination of currently available and/or future developed electronic components, semiconductor devices, and/or logic elements capable of receiving information and/or data from the HPCs 150 and selecting HPCs 150 for inclusion in a side-channel attack detection HPC sub-set 160. The HPCs included in the side-channel attack detection HPC sub-set 160 include HPCs $150_a$-$150_m$ that demonstrate reliable anomalous behavior and/or activity in response to execution of side channel attack instruction sets by the processor circuitry 120, such as a Spectre or Meltdown type timing-based, side-channel attack. In embodiments, the processor circuitry 120 may provide all or a portion of the hardware counter anomaly detection circuitry 110. In implementations, the hardware counter anomaly detection circuitry 110 may include machine learning circuitry that is trained by executing one or more training data sets. In embodiments, the one or more training data sets may include at least one of: one or more application instruction sets and/or one or more side-channel attack instruction sets.

In embodiments, the hardware counter anomaly detection circuitry 110 may poll the HPCs 150 to retrieve information and/or data from some or all of the plurality of HPCs 150. In embodiments, the hardware counter anomaly detection circuitry 110 may receive system and/or processor information and/or data from each of at least some of the plurality of HPCs 150 on a periodic, aperiodic, intermittent, or continuous basis. In embodiments, the hardware counter anomaly detection circuitry 110 may receive system and/or processor information and/or data from each of at least some of the plurality of HPCs 150 on an event driven basis, for example based on counter frequency or rate exceeding a defined trigger threshold (the rate of increase or decrease in counter activity exceeds a defined threshold, the frequency of performance counter activity increases or decreases above/below a defined threshold, etc.).

The processor circuitry 120 may include both processor circuitry and processor cache circuitry. In embodiments, all or a portion of the hardware counter anomaly detection circuitry 110 may be disposed in the processor unit 120. The processor circuitry 120 may include any number and/or combination of currently available and/or future developed electrical components, semiconductor devices, and/or logic elements capable of executing one or more machine-readable instruction sets and communicating with one or more external input and/or output devices via one or more communicably coupled I/O interfaces. In various embodiments, the processor circuitry 120 may include any of a wide variety of commercially available processors, including without limitation, an AMD® Athlon®, Duron® or Opteron® processor: an ARM® application, embedded and secure processors; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon®, Xeon Phi®, or XScale® processor. Further, processor circuitry 120 may include a multi-core processor (whether the multiple cores coexist on the same or separate dies), and/or a multi-processor architecture of some other variety by which multiple physically separate processors are in some way linked. The processor circuitry 120 may include but is not limited to: a system-on-chip (SoC), a field programmable gate array (FPGA), a multi-chip module (MCM), an application specific integrated circuit (ASIC), or similar.

The storage device 130 includes any number and/or combination of currently available and/or future developed systems, devices, or combination of systems and devices capable of persistent data storage. In embodiments, the storage device 130 may store or otherwise retain machine-readable instruction sets that include but are not limited to: one or more application instruction sets 142, one or more side channel attack instruction sets, and/or one or more hardware counter anomaly detection instruction sets 146.

In various embodiments, the storage device 130 may be based on any of wide variety of information storage technologies, possibly including volatile technologies requiring the uninterrupted provision of electric power, and possibly including technologies entailing the use of machine-readable storage media that may be removable, or that may not be removable. Thus, the storage device 130 may comprise any of a wide variety of types of storage device, including without limitation, read-only memory (ROM), random-access memory (RAM), dynamic RAM (DRAM). Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although the storage device 130 is depicted as a single block, one or more of these may comprise multiple storage devices that may be based on differing storage technologies. Thus, for example, one or more storage device 130 may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM).

In embodiments, the application instruction sets 142 include any number and/or combination of programs, instructions, logic, and similar that are useful for establishing baseline HPC performance data. In embodiments, the side-channel attack instruction sets 144 include any number and/or combination of programs, instruction sets, logic, or similar capable of providing behaviors typically identified with one or more side channel attacks. For example, the side-channel attack instruction sets 144 may include one or more instruction sets that perform or simulate the performance of a timing based side channel attack such as a Spectre or Meltdown type side-channel attack. The hardware counter anomaly detection instruction sets 146 include instruction sets useful for monitoring and/or sampling information and/or data generated by hardware performance counters 150. The hardware counter anomaly detection instruction sets 146 may include instruction sets useful for performing time series feature extraction on the data and/or information received from the hardware performance counters 150. The hardware counter anomaly detection instruction sets 146 may include instructions sets useful for performing one-class anomaly detection on the features extracted from the data and/or information received from the hardware performance counters 150. The hardware counter anomaly detection instruction sets 146 may include instructions sets useful for identifying a subset of hardware performance counters 160 that demonstrate the greatest anomalies during a side-channel attack.

The hardware performance counters $150_1$-$150_n$ include any number and/or combination of systems and/or devices capable of measuring or monitoring event occurrences within the system 100. In some implementations, the processor circuitry 120 may provide some or all of the HPCs 150. In some implementations, some or all of the HPCs 150 may be disposed in one or more semiconductor packages that are communicably coupled to the processor circuitry 120. The hardware performance counters 150 may be embodied as hardware, software, and/or combinations thereof. The HPCs 150 may collect performance data associated with the system 100 and/or processor circuitry 120 on a periodic, aperiodic, intermittent, or continuous basis.

Since there may be a large number of HPCs 150 installed on any given system, collecting HPC performance data at frequent intervals will generate a large quantity of data. However, only a relatively small number of HPCs 150 will demonstrate aberrant or anomalous behavior during a side-channel attack. Thus, if possible to identify those HPCs 150 that provide the greatest reliability and consistency in detecting side-channel attacks based on aberrant or anomalous behavior during such attacks, the volume of collected data and, consequently, processor overhead is significantly reduced. The systems and methods described herein beneficially and advantageously employ the hardware counter anomaly detection circuitry 110 to identify those HPCs 150 demonstrating aberrant or anomalous behavior as a side-channel attack occurs.

During a side-channel attack, the normal output of one or more HPCs 150 will change, the output will become anomalous. The hardware counter anomaly detection circuitry 110 detects this anomalous behavior and identifies the respective HPC 150 demonstrating the anomalous behavior as an HPC 150 that potentially may be used to identify a side-channel attack occurrence. After identifying the HPCs 150 demonstrating identifiable anomalous behavior during the execution of the side-channel attack instruction sets 144, the hardware counter anomaly detection circuitry 110 selects at least a portion of the identified anomalous HPCs 150 for inclusion in an HPC Sub-Set 160 that includes those HPCs $150_a$-$150_m$ demonstrating a consistent, detectable, anomalous behavior while the side-channel attack was in progress.

In embodiments, the processor circuitry 120 may communicate via a wired or wireless communication interface 170 information indicative of the HPCs $150_a$-$150_m$ included in the HPC Sub-Set 160 across one or more networks 180 to one or more external devices 190. The one or more external devices 190 may then use the received information to detect a side-channel attack using HPC data collected from the HPCs $150_a$-$150_m$ included in the HPC Sub-Set 160.

Figure 2:
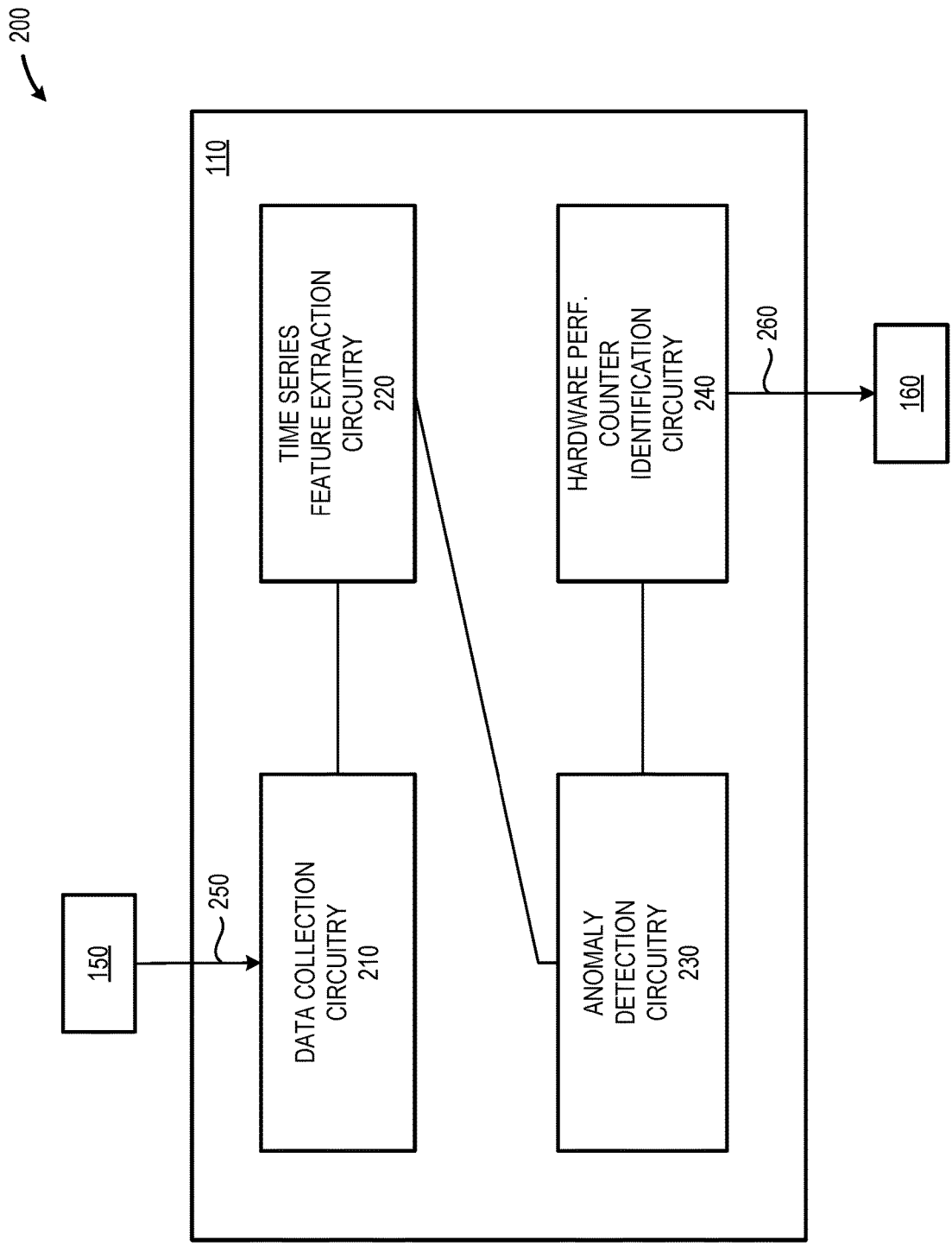
FIG. 2 is a block diagram of an illustrative hardware counter anomaly detection system 200 that includes data collection circuitry, time series feature extraction circuitry, anomaly detection circuitry, and hardware performance counter identification circuitry, in accordance with at least one embodiment described herein.

FIG. 2 is a block diagram of an illustrative hardware counter anomaly detection system 200 that includes data collection circuitry 210, time series feature extraction circuitry 220, anomaly detection circuitry 230, and hardware performance counter identification circuitry 240, in accordance with at least one embodiment described herein. As depicted in FIG. 2, the hardware counter anomaly detection system 200 receives, as an input, information and/or data 250 generated by the hardware counters 150 and generates, as an output, information and/or data 260 indicative of the HPCs identified as providing a reliable and consistent indication of a side-channel attack. In embodiments, some or all of the data collection circuitry 210, time series feature extraction circuitry 220, anomaly detection circuitry 230, and hardware performance counter identification circuitry 240 may execute machine-readable instruction sets to provide the functionality described herein.

The data collection circuitry 210 includes any number and/or combination of currently available and/or future developed electrical components, semiconductor devices, and/or logic elements capable of receiving the information and/or data from a plurality of hardware performance counters 150, each of which monitor one or more system and/or processor operational parameters. In embodiments, the data collection circuitry 210 may include one or more hardware and/or software interfaces capable of receiving signals containing information and/or data from some or all of the plurality of HPCs 150. In embodiments, the data collection circuitry 210 may include filtering and/or signal conditioning circuitry to reduce or eliminate noise in the signals received from some or all of the plurality of HPCs 150.

The time-series feature extraction circuitry 220 includes any number and/or combination of currently available and/or future developed electrical components, semiconductor devices, and/or logic elements capable of mathematically extracting HPC features from the information and/or data received from the HPCs 150. In embodiments, the time-series feature extraction circuitry 220 may perform a transform on the received HOC information and/or data to shift the received information and/or data from the time domain to a time/frequency domain. In embodiments, the time-series feature extraction circuitry 220 may perform a Haar Wavelet Transform on the information and/or data 250 received from the HPCs 150.

In embodiments, the collection of time series information and/or data 250 from the HPCs 150 may be considered to construct a D-dimensional tensor, where D represents the number of HPCs. Each of the HPCs 150 generates a data matrix of size $M^{n \times d}$ where n is the number of time series samples and d represents the number of values collected during the time period. Taking an illustrative HPC, if 10 applications (i.e., benign workloads) are independently performed 5 times and a side-channel attack instruction is independently performed 20 time, then:

$$n = 10 \times 5 + 20 = 70 \quad (1)$$

Suppose the sample interval is 500 milliseconds and for a total sampling time of 10 minutes, then:

$$d = 10 \times 60 \times 2 = 1200 \quad (2)$$

Hence the resultant data matrix for the illustrative HPC will be $M^{70 \times 1200}$.

Each of the plurality of HPCs may be sampled at the same or different rates or frequencies. In such instances the missing values may be imputed, for example using a mean or median value to fill in the missing values. In some instances, the HPC time series may have differing lengths. In such instances, the time series may be padded to achieve equal time lengths.

In embodiments, feature extraction may be performed on the raw time-series dataset collected from the HPCs 150. In such embodiments, a wavelet transform, such as a Haar wavelet transform may be applied. The Haar wavelet transform includes a sequence of rescaled "square-shaped" functions that together form a wavelet family or basis. The Haar wavelet function may be defined as, for every pair d, k of integers:

$$\Psi_{d,k}(t) = 2^{d/2} \Psi(2^d t - k), t \in R \quad (3)$$

In embodiments, the time-series feature extraction circuitry 220 performs feature extraction by applying the Haar wavelet transform to each HPC time series.

The anomaly detection circuitry 230 includes any number and/or combination of currently available and/or future developed electrical components, semiconductor devices, and/or logic elements capable of detecting anomalous activity and/or behavior for each of the plurality of HPCs 150. In embodiments, the anomaly detection circuitry 230 may detect anomalous HPC activity and/or behavior by analyzing the time domain information and/or data provided by each respective one of the plurality of HPCs 150. In other embodiments, the anomaly detection circuitry 230 may detect anomalous activity and/or behavior by analyzing the transformed time/frequency domain information and/or data provided by each respective one of the plurality of HPCs 150. In some implementations, the anomaly detection circuitry 230 may be implemented at a server and/or host system level such that analysis of HPC information and/or data occurs at the server/host level and results are communicated via the communications interface circuitry 170 to the external devices 190. In other implementations, the anomaly detection circuitry 230 may be implemented at the client or user level such that analysis of HPC information and/or data occurs at the client/user level.

In embodiments, the anomaly detection circuitry 230 is trained using the Haar wavelet transformed time series. The use of anomaly detection rather than classification beneficially permits the systems and methods disclosed herein to detect new side-channel attacks that may not have been included in the data set used to originally train the anomaly detection circuitry 230. In embodiments, the anomaly detection circuitry 230 include a one-class support vector machine. A one-class support vector machine separates data points (i.e., the transformed information and/or data received from the HPCs 150) from the origin and maximizes the distance from a hyperplane to the origin. This results in a binary function that captures the regions in the input space where the probability density of the data lives. The one-class support vector this returns +1 (i.e., TRUE) in a "small" area that captures the region generated by the training data and −1 (i.e., FALSE) elsewhere. In embodiments, the quadratic programming minimization function may is as follows:

$$\min_{w,\epsilon_i,\rho} \frac{1}{2}\|w\|^2 + \frac{q}{vd}\sum_{i=1} \epsilon_i - \rho \qquad (4)$$

Subject to:

$$(w \cdot \phi(x_i)) \geq \rho - \epsilon_i \qquad (5)$$
for all $i = 1, 2, \ldots, d$; and $$\epsilon_i \geq 0 \qquad (6)$$
for all $i = 1, 2, \ldots, d$.

The hardware performance counter identification circuitry 240 includes any number and/or combination of currently available and/or future developed electrical components, semiconductor devices, and/or logic elements capable of grouping or otherwise logically associating those HPCs identified as demonstrating anomalous and/or aberrant activity and/or behavior using the results and/or output data received from the anomaly detection circuitry 230. In embodiments, the hardware performance counter identification circuitry 240 may determine the degree of anomalous behavior and/or activity of each of the HPCs 150 identified by the anomaly detection circuitry 230 as "anomalous." In embodiments, the hardware performance counter identification circuitry 240 and/or the anomaly detection circuitry 230 may quantify the degree of anomalous activity and/or behavior of an HPC by assigning one or more anomaly values to the respective HPC based on the degree of anomalous activity and/or behavior. To select the HPCs 150 for inclusion in the side-channel attack detection HPC sub-set 160, the hardware performance counter identification circuitry 240 may compare the anomaly value assigned by the anomaly detection circuitry 230 to each of the plurality of HPCs 150 with one or more defined threshold values. In embodiments, the hardware performance counter identification circuitry 240 generates information and/or data representative of those HPCs 150 identified as providing a consistent and/or reliable indication of an occurrence of a side channel attack, such as a Spectre or Meltdown timing-type side channel attack. In embodiments, the hardware performance counter identification circuitry 240 generates an output signal 260 that includes information and/or data that includes a side-channel attack detection HPC sub-set 160. The side-channel attack detection HPC sub-set 160 includes information and/or data that identifies the HPCs $150_a$-$150_m$ capable of providing a robust and reliable indication of a side channel attack.

FIG. 3A is a listing 300A of illustrative candidate HPCs $150_1$-$150_{28}$, in accordance with at least one embodiment described herein. Although FIG. 3A lists a number of example processor-specific HPCs 150, one of ordinary skill in the relevant arts will readily appreciate that each system, processor, and/or microprocessor may have a greater or lesser number of the same or different HPCs 150. The systems and methods described herein are equally applicable to detecting side-channel based attacks on any hardware platform or processor. Such HPCs 150 should be considered as falling within the scope of this disclosure.

Figure 3B:
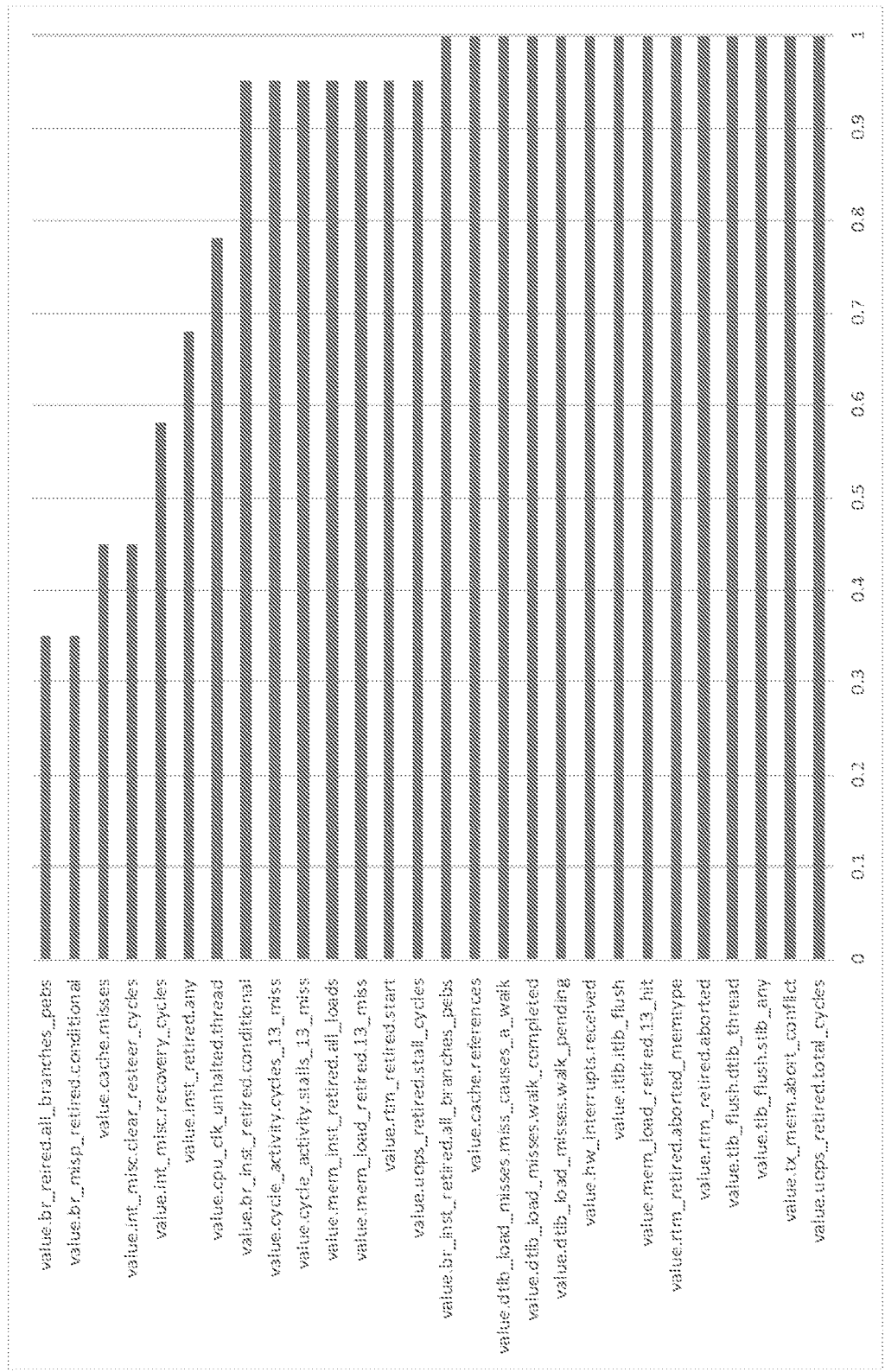
FIG. 3B is a graph that depicts example output from the anomaly detection circuitry, in accordance with at least one embodiment described herein.

FIG. 3B is a graph 300B that depicts example output from the anomaly detection circuitry 230, in accordance with at least one embodiment described herein. As depicted in FIG. 3B, the activity and/or behavior of each of the HPCs 150 listed in FIG. 3A, may be analyzed while a system is subjected to a side-channel attack. The resultant output may be normalized and the results tabulated to provide the graph 300B depicted in FIG. 3B. As depicted in FIG. 3B, about twenty of the HPCs 150 provide a relatively strong indication of an occurrence of a side-channel attack (e.g., a normalized value of greater than 0.85 as depicted in graph 300B). The remaining HPCs 150 provide a less reliable indication of an occurrence of a side channel attack.

Figure 3C:
FIG. 3C is a graph that depicts the example output from the hardware performance counter identification circuitry, in accordance with at least one embodiment described herein.

FIG. 3C is a graph 300C that depicts the example output from the hardware performance counter identification circuitry 240, in accordance with at least one embodiment described herein. As depicted in FIG. 3C, the hardware performance counter identification circuitry 240 identifies the HPCs $150_a$-$150_m$ that provide the greatest reliability in detecting an occurrence of a side-channel attack. The hardware performance counter identification circuitry 240 groups the identified HPCs 150 into the side-channel attack detection HPC sub-set 160.

Figure 4:
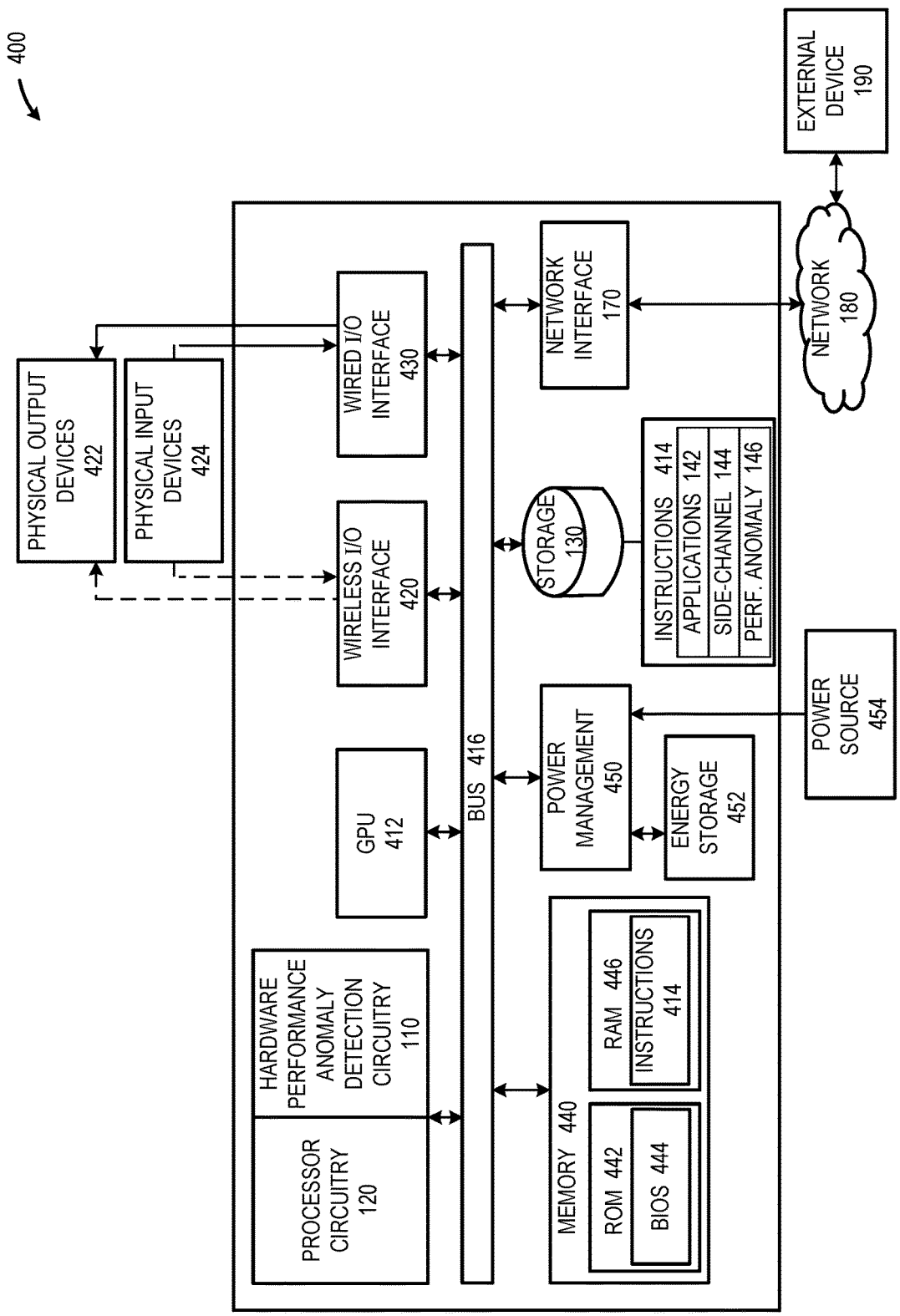
FIG. 4 is a schematic diagram of an illustrative electronic, processor-based, device that includes a central processing unit (CPU) or multi-chip module (MCM) having hardware counter anomaly detection circuitry and processor circuitry, in accordance with at least one embodiment described herein.

FIG. 4 is a schematic diagram of an illustrative electronic, processor-based, device 400 that includes a central processing unit (CPU) or multi-chip module (MCM) having hardware counter anomaly detection circuitry 110 and processor circuitry 120, in accordance with at least one embodiment described herein. The processor-based device 400 may additionally include one or more of the following: a graphical processing unit 412, a wireless input/output (I/O) interface 420, a wired I/O interface 430, system memory 150, power management circuitry 450, a non-transitory storage device 490, and a network interface 170. The following discussion provides a brief, general description of the components forming the illustrative processor-based device 400. Example, non-limiting processor-based devices 400 may include, but are not limited to: smartphones, wearable computers, portable computing devices, handheld computing devices, desktop computing devices, blade server devices, workstations, and similar.

The processor-based device 400 includes hardware counter anomaly detection circuitry 110, processor circuitry 120, and, in some embodiments, cache circuitry. In operation, the hardware counter anomaly detection circuitry 110 may receive information and/or data from each of a plurality of hardware counters 150. The hardware counter anomaly detection circuitry 110 may convert the time domain information and/or data collected from the HPCs 150 to a time/frequency domain. In embodiments, using a Haar wavelet transform, the hardware counter anomaly detection circuitry 110 performs the time/frequency transform on the time domain information and/or data received from the HPCs 150. The hardware counter anomaly detection circuitry 110 includes anomaly detection circuitry that performs one-class anomaly detection on the frequency domain information and/or data provided by the HPCs 150.

In some embodiments, the processor-based device 400 includes graphics processor circuitry 412 capable of executing machine-readable instruction sets 414 and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 120 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 400 includes a bus or similar communications link 416 that communicably couples and facilitates the exchange of information and/or data between various system components including the processor circuitry 120, the graphics processor circuitry 412, one or more wireless I/O interfaces 420, one or more wired I/O interfaces 430, the system memory 440, one or more storage devices 130, and/or one or more network interfaces 170. The processor-based device 400 may be referred to in the singular herein, but this is not intended to limit the embodiments to a single processor-based device 400, since in certain embodiments, there may be more than one processor-based device 400 that incorporates, includes, or contains any number of communicably coupled, collocated, or remote networked circuits or devices.

The processor circuitry 120 may include any number, type, or combination of currently available or future developed devices capable of executing machine-readable instruction sets. The processor circuitry 120 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 4 are of conventional design. Consequently, such blocks need not be described in further detail herein, as they will be understood by those skilled in the relevant art. The bus 416 that interconnects at least some of the components of the processor-based device 400 may employ any currently available or future developed serial or parallel bus structures or architectures.

The system memory 440 may include read-only memory ("ROM") 442 and random access memory ("RAM") 446. A portion of the ROM 442 may be used to store or otherwise retain a basic input/output system ("BIOS") 444. The BIOS 444 provides basic functionality to the processor-based device 400, for example by causing the processor circuitry 120 to load and/or execute one or more machine-readable instruction sets 414. In embodiments, at least some of the one or more machine-readable instruction sets 414 cause at least a portion of the processor circuitry 120 to provide, create, produce, transition, and/or function as a dedicated, specific, and particular machine, for example a word processing machine, a digital image acquisition machine, a media playing machine, a gaming system, a communications device, a smartphone, or similar.

The processor-based device 400 may include at least one wireless input/output (I/O) interface 420. The at least one wireless I/O interface 420 may be communicably coupled to one or more physical output devices 422 (tactile devices, video displays, audio output devices, hardcopy output devices, etc.). The at least one wireless I/O interface 420 may communicably couple to one or more physical input devices 424 (pointing devices, touchscreens, keyboards, tactile devices, etc.). The at least one wireless I/O interface 420 may include any currently available or future developed wireless I/O interface. Example wireless I/O interfaces include, but are not limited to: BLUETOOTH®, near field communication (NFC), and similar.

The processor-based device 400 may include one or more wired input/output (I/O) interfaces 430. The at least one wired I/O interface 430 may be communicably coupled to one or more physical output devices 422 (tactile devices, video displays, audio output devices, hardcopy output devices, etc.). The at least one wired I/O interface 430 may be communicably coupled to one or more physical input devices 424 (pointing devices, touchscreens, keyboards, tactile devices, etc.). The wired I/O interface 430 may include any currently available or future developed I/O interface. Example wired I/O interfaces include but are not limited to: universal serial bus (USB), IEEE 1394 ("FireWire"), and similar.

The processor-based device 400 may include one or more communicably coupled, non-transitory, data storage devices 130. The data storage devices 130 may include one or more hard disk drives (HDDs) and/or one or more solid-state storage devices (SSDs). The one or more data storage devices 130 may include any current or future developed storage appliances, network storage devices, and/or systems. Non-limiting examples of such data storage devices 130 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 130 may include one or more removable storage devices, such as one or more flash drives, flash memories, flash storage units, or similar appliances or devices capable of communicable coupling to and decoupling from the processor-based device 400.

The one or more data storage devices 490 may include interfaces or controllers (not shown) communicatively coupling the respective storage device or system to the bus 416. The one or more data storage devices 490 may store, retain, or otherwise contain machine-readable instruction sets, data structures, program modules, data stores, databases, logical structures, and/or other data useful to the processor circuitry 120 and/or graphics processor circuitry 412 and/or one or more applications executed on or by the processor circuitry 120 and/or graphics processor circuitry 412. In some instances, one or more data storage devices 130 may be communicably coupled to the processor circuitry 120, for example via the bus 416 or via one or more wired communications interfaces 430 (e.g., Universal Serial Bus or USB); one or more wireless communications interfaces 420 (e.g., Bluetooth®, Near Field Communication or NFC); and/or one or more network interfaces 170 (IEEE 802.3 or Ethernet, IEEE 802.11, or WiFi®, etc.).

Machine-readable instruction sets 414 and other programs, applications, logic sets, and/or modules may be stored in whole or in part in the system memory 440. Such instruction sets 414 may be transferred, in whole or in part, from the one or more data storage devices 130. The instruction sets 414 may be loaded, stored, or otherwise retained in system memory 440, in whole or in part, during execution by the processor circuitry 120 and/or graphics processor circuitry 412.

The processor-based device 400 may include power management circuitry 450 that controls one or more operational aspects of the energy storage device 452. In embodiments, the energy storage device 452 may include one or more primary (i.e., non-rechargeable) or secondary (i.e., rechargeable) batteries or similar energy storage devices. In embodiments, the energy storage device 452 may include one or more supercapacitors or ultracapacitors. In embodiments, the power management circuitry 450 may alter, adjust, or control the flow of energy from an external power source 454 to the energy storage device 452 and/or to the processor-based device 400. The power source 454 may include, but is not limited to, a solar power system, a commercial electric grid, a portable generator, an external energy storage device, or any combination thereof.

For convenience, the processor circuitry 120, the graphics processor circuitry 412, the wireless I/O interface 420, the wired I/O interface 430, the system memory 440, the power management circuitry 450, the storage device 130, and the network interface 170 are illustrated as communicatively coupled to each other via the bus 416, thereby providing connectivity between the above-described components. In alternative embodiments, the above-described components may be communicatively coupled in a different manner than illustrated in FIG. 4. For example, one or more of the above-described components may be directly coupled to other components, or may be coupled to each other, via one or more intermediary components (not shown). In another example, one or more of the above-described components may be integrated into the processor circuitry 120 and/or the graphics processor circuitry 412. In some embodiments, all or a portion of the bus 416 may be omitted and the components are coupled directly to each other using suitable wired or wireless connections.

Figure 5:
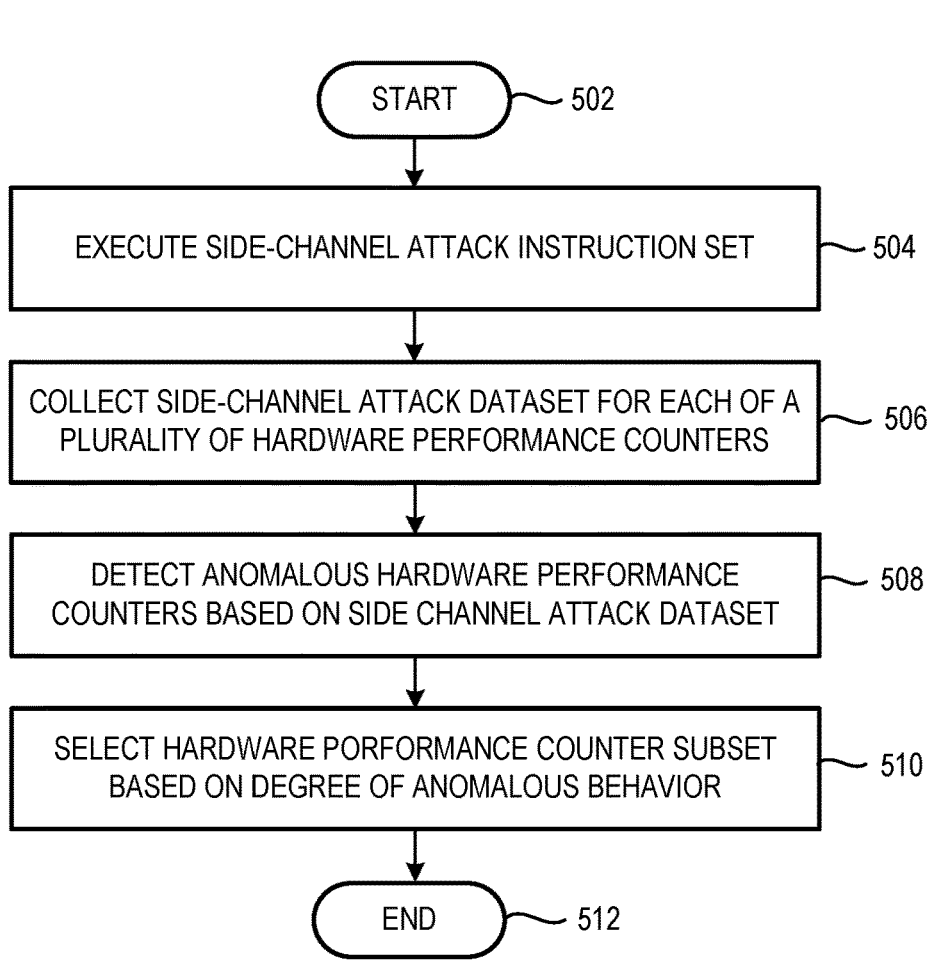
FIG. 5 is a high-level flow diagram of an illustrative method of a machine learning technique to select hardware performance counters capable of reliability and consistently detecting an occurrence of a side-channel attack, in accordance with at least one embodiment described herein.

FIG. 5 is a high-level flow diagram of an illustrative method 500 of a machine learning technique to select hardware performance counters capable of reliability and consistently detecting an occurrence of a side-channel attack, in accordance with at least one embodiment described herein. In embodiments, the hardware counter anomaly detection circuitry 110 may be trained using one or more side-channel attack instruction sets 144 that provide or otherwise establish "anomalous" or "aberrant" HPC performance data (i.e., HPC performance data during a side-channel attack) for some or all of the plurality of HPCs 150. In embodiments, the method 500 collects samples from each of some or all of the HPCs 150 monitoring system and/or processor performance. The method converts the collected samples from time domain to time/frequency domain using one or more transforms and employs a one class support vector anomaly detection to detect those HPCs 150 demonstrating abnormal or aberrant activity and/or behavior during a side-channel attack. The method 500 commences at 502.

At 504, the hardware counter anomaly detection circuitry 110 causes the processor circuitry 120 to execute one or more side-channel attack instruction sets 144. Example side-channel attack instruction sets include but are not limited to: one or more Spectre timing-based side channel attack instruction sets and/or one or more Meltdown timing-based side channel attack instruction sets.

At 506, the hardware counter anomaly detection circuitry 110 collects a side-channel attack dataset for each of the plurality of HPCs 150. In embodiments, the side-channel attack dataset may include event count data generated by each of some or all of the HPCs 150.

At 508, the hardware counter anomaly detection circuitry 110 detects whether each of the plurality of HPCs 150 demonstrates anomalous or aberrant activity and/or behavior in response to the execution of the side-channel attack instruction set by the processor circuitry 120. In embodiments, the hardware counter anomaly detection circuitry 110 may perform one or more transforms on the time-domain data received from the HPCs 150 to convert at least a portion of the data to a time/frequency domain. For example, the hardware counter anomaly detection circuitry 110 may perform a Haar wavelet transform to convert the data received from the HPCs 150 from the time domain to the time/frequency domain.

After converting the data received from the HPCs 150 to the time/frequency domain, the hardware counter anomaly detection circuitry 110 performs a one-class support vector analysis on the transformed data to identify those HPCs demonstrating anomalous and/or aberrant activity and/or behavior in response to the side-channel attack.

At 510, the hardware counter anomaly detection circuitry 110 selects HPCs 150 demonstrating anomalous and/or aberrant behavior greater than a defined threshold value for inclusion in the side-channel attack detection HPC sub-set 160. The method 500 concludes at 512.

Figure 6:
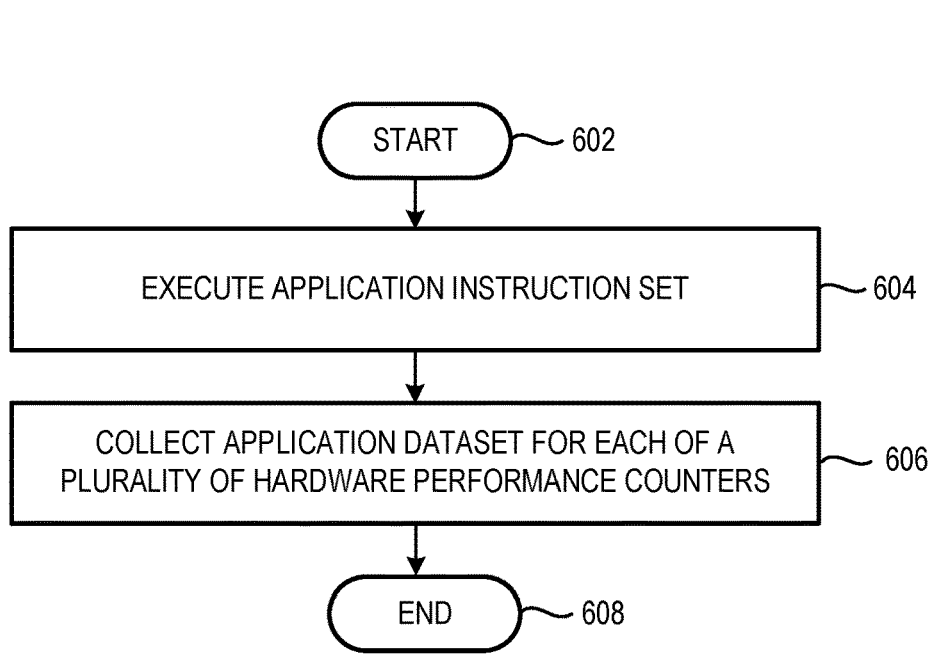
FIG. 6 is a high-level flow diagram of an illustrative method of developing a baseline dataset during execution of one or more application instruction sets by the processor circuitry, in accordance with at least one embodiment described herein.

FIG. 6 is a high-level flow diagram of an illustrative method 600 of developing a baseline dataset during execution of one or more application instruction sets 142 by the processor circuitry 120, in accordance with at least one embodiment described herein. In embodiments, the hardware counter anomaly detection circuitry 110 may be trained using one or more application instruction sets 142 to provide or otherwise establish "baseline" performance data (i.e., performance data in the absence of a side-channel attack) for some or all of the plurality of HPCs 150. The method 600 may be used in conjunction with method 500, described in detail above with regard to FIG. 5. In embodiments, the side-channel attack dataset collected during execution of the side-channel attack instruction set 144 by the processor circuitry 120 may be compared to a "baseline" or similar dataset collected during the execution of application instructions 142 by the processor circuitry 120. The method 600 commences at 602.

At 604, the processor circuitry 120 executes at least one application instruction set 142. In embodiments, the hardware counter anomaly detection circuitry 110 may cause the processor circuitry 120 to execute the at least one application instruction set 142.

At 606, the hardware counter anomaly detection circuitry 110 collects system and/or processor information and/or data from the HPCs 150 as the processor circuitry 120 executes the at least one application instruction set 142. In embodiments, the hardware counter anomaly detection circuitry 110 may poll the HPCs 150 to retrieve information and/or data from some or all of the plurality of HPCs 150. In embodiments, the hardware counter anomaly detection circuitry 110 may store all or a portion of the information and/or data collected from the HPCs 150 as the processor circuitry 120 executes the application instruction sets 142. This stored information and/or data may be used as "baseline" data by the hardware counter anomaly detection circuitry 110 to detect anomalous and/or aberrant behavior indicative of a side-channel attack. The method 600 concludes at 608.

Figure 7:
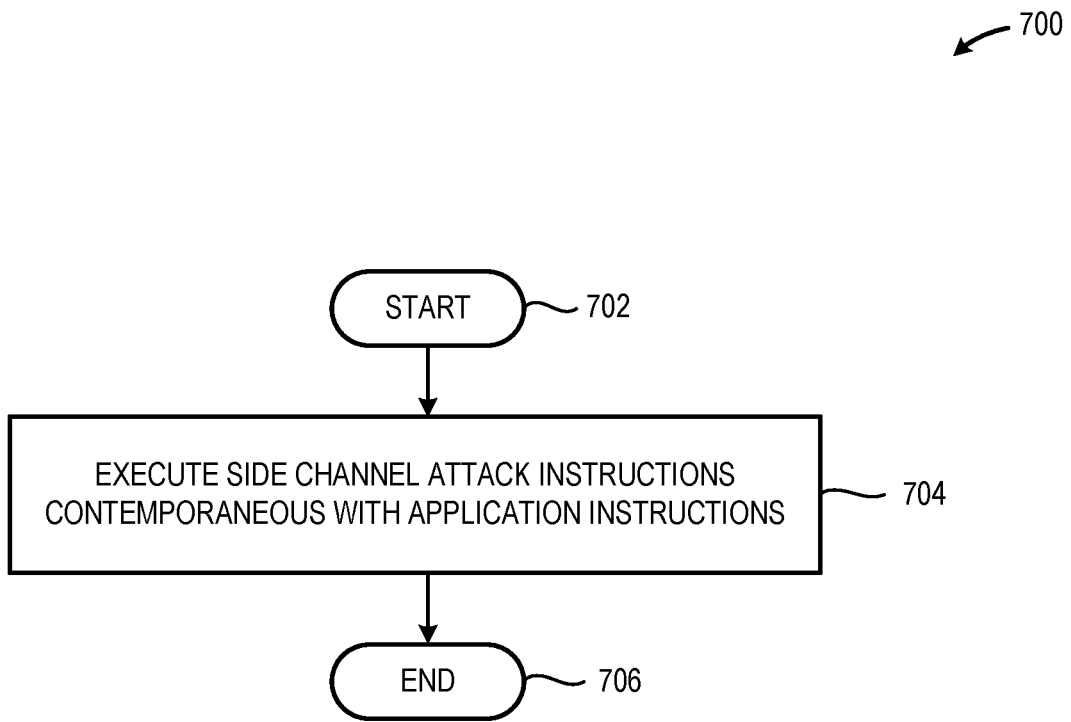
FIG. 7 is a high-level flow diagram of an illustrative method of developing a side-channel attack dataset during the contemporaneous execution of one or more application instruction sets and one or more side-channel attack instruction sets by the processor circuitry, in accordance with at least one embodiment described herein.

FIG. 7 is a high-level flow diagram of an illustrative method 700 of developing a side-channel attack dataset during the contemporaneous execution of one or more application instruction sets 142 and one or more side-channel attack instruction sets 144 by the processor circuitry 120, in accordance with at least one embodiment described herein. In embodiments, the hardware counter anomaly detection circuitry 110 may be trained using one or more side-channel attack instruction sets 144 that provide or otherwise establish "anomalous" or "aberrant" HPC performance data (i.e., HPC performance data during a side-channel attack) for some or all of the plurality of HPCs 150.

The method 700 may be used in conjunction with methods 500 and/or 600, described in detail above with regard to FIGS. 5 and 6. The method 700 commences at 702.

At 704, the hardware counter anomaly detection circuitry 110 collects system and/or processor information and/or data from the HPCs 150 as the processor circuitry 120 contemporaneously executes at least one application instruction set 142 and at least one side-channel attack instruction set 144. In embodiments, the hardware counter anomaly detection circuitry 110 may poll the HPCs 150 to retrieve information and/or data from some or all of the plurality of HPCs 150. In other embodiments, at least a portion of the plurality of HPCs 150 may push information and/or data to the hardware counter anomaly detection circuitry 110. The method 700 concludes at 706.

While FIGS. 5, 6, and 7 illustrate various operations according to one or more embodiments, it is to be understood that not all of the operations depicted in FIGS. 5, 6, and 7 are necessary for other embodiments. Indeed, it is fully contemplated herein that in other embodiments of the present disclosure, the operations depicted in FIGS. 5, 6, and 7, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods of detecting a side-channel attack using hardware counter anomaly detection circuitry to select a subset of HPCs demonstrating anomalous behavior in response to a side-channel attack. The hardware counter anomaly detection circuitry includes data collection circuitry to collect data from a plurality of HPCs, time/frequency domain transform circuitry to transform the collected data to the frequency domain, one-class support vector anomaly detection circuitry to detect anomalous or aberrant behavior by the HPCs. The hardware counter anomaly detection circuitry selects the HPCs having reliable and consistent anomalous activity or behavior in response to a side-channel attack and groups those HPCs into a side-channel attack detection HPC sub-set that may be communicated to one or more external devices.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for generating a side-channel attack HPC sub-set by training hardware counter anomaly detection circuitry using one or more application instruction sets and one or more side-channel attack instruction sets to detect anomalous HPC activity or behavior indicative of a potential side-channel attack, such as Spectre or Meltdown.

According to example 1, there is provided a side channel attack detection system. The system may include: processor circuitry; a plurality of HPCs coupled to the processor circuitry; hardware performance anomaly detection circuitry; and at least one storage device that includes machine-executable instructions that, when executed by the hardware performance anomaly detection circuitry, cause the hardware performance anomaly detection circuitry to: collect information representative of a side-channel attack dataset for each respective one of a plurality of HPCs as the processor circuitry executes at least one side channel attack detection instruction set; detect whether each of the plurality of HPCs demonstrates anomalous activity as the processor circuitry executes the at least one side-channel attack instruction set; and select the at least one HPC for inclusion in a side-channel attack detection HPC sub-set based on the demonstrated anomalous activity of the respective at least one HPC.

Example 2 may include elements of example 1 where the machine-executable instructions may further cause the hardware performance anomaly detection circuitry to: collect information representative of a baseline dataset for each respective one of a plurality of HPCs as the processor circuitry executes at least one application instruction set.

Example 3 may include elements of any of examples 1 or 2 where the instructions that cause the hardware performance anomaly detection circuitry to collect information representative of a side-channel attack dataset for each respective one of a plurality of HPCs may further cause the hardware performance anomaly detection circuitry to: collect information representative of a side-channel attack dataset for each respective one of a plurality of HPCs as the processor circuitry contemporaneously executes at least one side channel attack detection instruction set and the at least one application instruction set.

Example 4 may include elements of any of examples 1 through 3 where the hardware performance anomaly detection circuitry includes data collection circuitry; where the machine executable instructions that cause the hardware performance anomaly detection circuitry to collect information representative of a side-channel attack dataset for each respective one of a plurality of HPCs as the processor circuitry contemporaneously executes at least one side channel attack detection instruction set and the at least one application instruction set, cause the data collection circuitry to: collect information representative of the side-channel attack dataset for each respective one of a plurality of HPCs as the processor circuitry contemporaneously executes the at least one side channel attack detection instruction set and the at least one application instruction set; and where the machine executable instructions that cause the hardware performance anomaly detection circuitry to collect information representative of a baseline dataset for each respective one of a plurality of HPCs as the processor circuitry executes at least one application instruction set, cause the data collection circuitry to: collect information representative of a baseline dataset for each respective one of a plurality of HPCs as the processor circuitry executes at least one application instruction set.

Example 5 may include elements of any of examples 1 through 4 where the hardware performance anomaly detection circuitry may include time series feature extraction circuitry; where the machine executable instructions that cause the hardware performance anomaly detection circuitry to detect whether each of the plurality of HPCs demonstrates anomalous activity as the processor circuitry executes the at least one side-channel attack instruction set, cause the time series feature extraction circuitry to: convert the baseline dataset from each of the plurality of HPCs from a time domain to a time/frequency domain; and convert the side-channel attack dataset from each of the plurality of HPCs from the time domain to the time/frequency domain.

Example 6 may include elements of any of examples 1 through 5 where the time feature extraction circuitry comprises Haar wavelet transform circuitry.

Example 7 may include elements of any of examples 1 through 6 where the hardware performance anomaly detection circuitry includes anomaly detection circuitry; where the machine executable instructions that cause the hardware performance anomaly detection circuitry to detect whether each of the plurality of HPCs demonstrates anomalous activity based on the deviation between the baseline dataset and the side-channel attack dataset for each respective one of the plurality of HPCs, cause the anomaly detection circuitry to: detect whether each of the plurality of HPCs demonstrates anomalous activity based on the deviation between the baseline dataset and the side-channel attack dataset for each respective one of the plurality of HPCs.

Example 8 may include elements of any of examples 1 through 7 where the anomaly detection circuitry may include: one-class support vector anomaly detection circuitry.

Example 9 may include elements of any of examples 1 through 8 where the hardware performance anomaly detection circuitry includes hardware performance counter identification circuitry; where the machine executable instructions that cause the hardware performance anomaly detection circuitry to detect whether each of the plurality of HPCs demonstrates anomalous activity based on the deviation between the baseline dataset and the side-channel attack dataset for each respective one of the plurality of HPCs, cause the hardware performance counter identification circuitry to: detect, for each of the plurality of HPCs, whether each of the plurality of HPCs demonstrates anomalous activity based on the deviation between the baseline dataset and the side-channel attack dataset for each respective one of the plurality of HPCs; and select the at least one HPC for inclusion in a side-channel attack detection HPC sub-set based on the demonstrated anomalous activity of the respective at least one HPC.

Example 10 may include elements of any of examples 1 through 9, and the system may additionally include: input/output (I/O) interface circuitry; where the at least one storage device further includes machine-executable instructions that, when executed by the processor circuitry, cause the processor circuitry to: generate an output signal that includes data indicative of the side-channel attack detection HPC sub-set; and communicate the output signal to one or more external processor-based devices.

According to example 11, there is provided a side channel attack detection method. The method may include: executing, by processor circuitry, at least one side channel attack instruction set; collecting, by hardware performance anomaly detection circuitry coupled to the processor circuitry, information representative of a side-channel attack dataset for each respective one of a plurality of HPCs; detecting, by the hardware performance anomaly detection circuitry, whether each of the plurality of HPCs demonstrates anomalous activity as the processor circuitry executes the at least one side-channel attack instruction set; and selecting, by the hardware performance anomaly detection circuitry, at least one HPC for inclusion in a side-channel attack detection HPC sub-set based on the demonstrated anomalous activity of the respective at least one HPC.

Example 12 may include elements of example 11, and the method may additionally include: executing, by the processor circuitry, at least one application instruction set; and collecting, via the hardware performance anomaly detection circuitry, information representative of a baseline dataset for each respective one of a plurality of HPCs.

Example 13 may include elements of any of examples 11 or 12 where executing at least one side channel attack instruction set may include: executing, by the processor circuitry, the at least one side channel attack instruction set contemporaneous with executing the at least one application instruction set; and where collecting information representative of a side-channel attack dataset for each respective one of a plurality of HPCs may further include: collecting, by the hardware performance anomaly detection circuitry, information representative of a side-channel attack dataset for each respective one of a plurality of HPCs as the processor circuitry contemporaneously executes the at least one side channel attack instruction set and the at least one application instruction set.

Example 14 may include elements of any of examples 11 through 13 where detecting whether each of the plurality of HPCs demonstrates anomalous activity as the processor circuitry executes the at least one side-channel attack instruction set may further include: detecting, by the hardware performance anomaly detection circuitry, whether each of the plurality of HPCs demonstrates anomalous activity based on a deviation between the baseline dataset and the side-channel attack dataset for each respective one of the plurality of HPCs.

Example 15 may include elements of any of examples 11 through 14 where collecting information representative of the baseline dataset for each respective one of the plurality of HPCs may include: collecting, via data collection circuitry disposed in the hardware performance anomaly detection circuitry, the information representative of the baseline dataset for each respective one of the plurality of HPCs; and where collecting information representative of the side-channel attack dataset for each respective one of the plurality of HPCs: collecting, by the data collection circuitry, information representative of the side-channel attack dataset for each respective one of the plurality of HPCs.

Example 16 may include elements of any of examples 11 through 15 where detecting whether each of the plurality of HPCs demonstrates anomalous activity based on the deviation between the baseline dataset and the side-channel attack dataset for each respective one of the plurality of HPCs may include: causing, by time series feature extraction circuitry disposed in the hardware performance anomaly detection circuitry, a conversion of the baseline dataset for each respective one of the plurality of HPCs from a time domain to a time/frequency domain; and causing, by the time series feature extraction circuitry, a conversion of the side-channel attack dataset for each respective one of the plurality of HPCs from the time domain to the time/frequency domain.

Example 17 may include elements of any of examples 11 through 16 where causing the conversion of the baseline dataset for each respective one of the plurality of HPCs from the time domain to the time/frequency domain, may include: causing, by Haar wavelet transform circuitry included in the time series feature extraction circuitry disposed in the hardware performance anomaly detection circuitry, the conversion of the baseline dataset for each respective one of the plurality of HPCs from the time domain to the time/frequency domain.

Example 18 may include elements of any of examples 11 through 17 where detecting whether each of the plurality of HPCs demonstrates anomalous activity based on the deviation between the baseline dataset and the side-channel attack dataset for each respective one of the plurality of HPCs may include: detecting, by anomaly detection circuitry disposed in the hardware performance anomaly detection circuitry, whether each of the plurality of HPCs demonstrates anomalous activity based on the deviation between the baseline dataset and the side-channel attack dataset for each respective one of the plurality of HPCs.

Example 19 may include elements of any of examples 11 through 18 where detecting whether each of the plurality of HPCs demonstrates anomalous activity based on the deviation between the baseline dataset and the side-channel attack dataset for each respective one of the plurality of HPCs may include: detecting, by one-class support vector anomaly detection circuitry disposed in the hardware performance anomaly detection circuitry, whether each of the plurality of HPCs demonstrates anomalous activity based on the deviation between the baseline dataset and the side-channel attack dataset for each respective one of the plurality of HPCs.

Example 20 may include elements of any of examples 11 through 19, and the method may additionally include: generating, by the processor circuitry, an output signal that includes data indicative of the side-channel attack detection HPC sub-set; and communicating, via input/output circuitry coupled to the processor circuitry, the output signal to one or more external processor-based devices.

According to example 21, there is provided a non-transitory machine-readable storage medium that includes machine-executable instructions. The machine-executable instructions, when executed by hardware performance anomaly detection circuitry coupled to processor circuitry, may cause the hardware performance anomaly detection circuitry to: collect information representative of a side-channel attack dataset for each respective one of a plurality of HPCs responsive to execution of at least one side channel attack instruction set by the processor circuitry; detect whether each of the plurality of HPCs demonstrates anomalous activity as the processor circuitry executes the at least one side-channel attack instruction set; and select at least one HPC for inclusion in a side-channel attack detection HPC sub-set based on the demonstrated anomalous activity of the respective at least one HPC.

Example 22 may include elements of example 21 where the machine-readable instruction set may cause the hardware performance anomaly detection circuitry to: collect information representative of a baseline dataset for each respective one of the plurality of HPCs responsive to execution of at least one application instruction set by the processor circuitry.

Example 23 may include elements of any of examples 21 and 22 where the instructions that cause the hardware performance anomaly detection circuitry to collect information representative of a side-channel attack dataset for each respective one of a plurality of HPCs responsive to execution of at least one side channel attack instruction set by the processor circuitry further cause the hardware performance anomaly detection circuitry to: collect information representative of a side-channel attack dataset for each respective one of a plurality of HPCs responsive to a contemporaneous execution of the at least one side channel attack instruction set and the at least one application instruction set by the processor circuitry.

Example 24 may include elements of any of examples 21 through 23 where the instructions that cause the hardware performance anomaly detection circuitry to detect whether each of the plurality of HPCs demonstrates anomalous activity as the processor circuitry executes the at least one side-channel attack instruction set further cause the hardware performance anomaly detection circuitry to: detect whether each of the plurality of HPCs demonstrates anomalous activity based on a deviation between the baseline dataset and the side-channel attack dataset for each respective one of the plurality of HPCs.

Example 25 may include elements of any of examples 21 through 24 where the instructions that cause the hardware performance anomaly detection circuitry to collect the information representative of the baseline dataset for each respective one of the plurality of HPCs further cause the hardware performance anomaly detection circuitry to: cause data collection circuitry disposed in the hardware performance anomaly detection circuitry, to collect the information representative of the baseline dataset for each respective one of the plurality of HPCs; and where the instructions that cause the hardware performance anomaly detection circuitry to collect the information representative of the side-channel attack dataset for each respective one of the plurality of HPCs further cause the hardware performance anomaly detection circuitry to: cause the data collection circuitry to collect the information representative of the side-channel attack dataset for each respective one of the plurality of HPCs.

Example 26 may include elements of any of examples 21 through 25 where the instructions that cause the hardware performance anomaly detection circuitry to detect whether each of the plurality of HPCs demonstrates anomalous activity based on the deviation between the baseline dataset and the side-channel attack dataset for each respective one of the plurality of HPCs further cause the hardware performance anomaly detection circuitry to: cause time series feature extraction circuitry disposed in the hardware performance anomaly detection circuitry, to convert the baseline dataset for each respective one of the plurality of HPCs from a time domain to a time/frequency domain; and cause the time series feature extraction circuitry to convert the side-channel attack dataset for each respective one of the plurality of HPCs from the time domain to the time/frequency domain.

Example 27 may include elements of any of examples 21 through 26 where the instructions that cause the time series feature extraction circuitry to convert the baseline dataset for each respective one of the plurality of HPCs from the time domain to the time/frequency domain further cause the time series feature extraction circuitry to: cause Haar wavelet transform circuitry included in the time series feature extraction circuitry to convert the baseline dataset for each respective one of the plurality of HPCs from a time domain to the time/frequency domain; and where the instructions that cause the time series feature extraction circuitry to convert the side-channel attack dataset for each respective one of the plurality of HPCs from the time domain to the time/frequency domain further cause the time series feature extraction circuitry to: cause the Haar wavelet transform circuitry to convert the side-channel attack dataset for each respective one of the plurality of HPCs from the time domain to the time/frequency domain.

Example 28 may include elements of any of examples 21 through 27 where the instructions that cause the hardware performance anomaly detection circuitry to detect whether each of the plurality of HPCs demonstrates anomalous activity based on the deviation between the baseline dataset and the side-channel attack dataset for each respective one of the plurality of HPCs further cause the hardware performance anomaly detection circuitry to: detect, by anomaly detection circuitry included in the hardware performance anomaly detection circuitry, whether each of the plurality of HPCs demonstrates anomalous activity based on the deviation between the baseline dataset and the side-channel attack dataset for each respective one of the plurality of HPCs.

Example 29 may include elements of any of examples 21 through 28 where the instructions that cause the anomaly detection circuitry to detect whether each of the plurality of HPCs demonstrates anomalous activity based on the deviation between the baseline dataset and the side-channel attack dataset for each respective one of the plurality of HPCs further cause the anomaly detection circuitry to: determine, by one-class support vector anomaly detection circuitry disposed in the hardware performance anomaly detection circuitry, the value representative of the deviation between the baseline dataset and the side-channel attack dataset for each respective one of the plurality of HPCs.

Example 30 may include elements of any of examples 21 through 29 where machine executable instructions further cause the processor circuitry to: generate an output signal that includes data indicative of the one or more HPCs for which the respective deviation between the baseline dataset and the side-channel attack dataset exceed the defined threshold value; and communicate, via input/output circuitry coupled to the processor circuitry, the output signal to one or more external processor-based devices.

According to example 31, there is provided a side channel attack detection system. The system may include: means for executing at least one side channel attack instruction set; means for collecting information representative of a side-channel attack dataset for each respective one of a plurality of HPCs; means for detecting whether each of the plurality of HPCs demonstrates anomalous activity as the processor circuitry executes the at least one side-channel attack instruction set; and means for selecting at least one HPC for inclusion in a side-channel attack detection HPC sub-set based on the demonstrated anomalous activity of the respective at least one HPC.

Example 32 may include elements of example 31, and the system may include: means for executing at least one application instruction set; and means for collecting information representative of a baseline dataset for each respective one of a plurality of HPCs.

Example 33 may include elements of any of examples 31 or 32 where the means for executing at least one side channel attack instruction set may include: means for executing the at least one side channel attack instruction set contemporaneous with executing the at least one application instruction set; and where the means for collecting information representative of a side-channel attack dataset for each respective one of a plurality of HPCs may include: means for collecting information representative of a side-channel attack dataset for each respective one of a plurality of HPCs as the processor circuitry contemporaneously executes the at least one side channel attack instruction set and the at least one application instruction set.

Example 34 may include elements of any of examples 31 through 33 where the means for detecting whether each of the plurality of HPCs demonstrates anomalous activity as the processor circuitry executes the at least one side-channel attack instruction set may include: means for detecting whether each of the plurality of HPCs demonstrates anomalous activity based on a deviation between the baseline dataset and the side-channel attack dataset for each respective one of the plurality of HPCs.

Example 35 may include elements of any of examples 31 through 34 where the means for collecting information representative of the baseline dataset for each respective one of the plurality of HPCs may include: means for collecting the information representative of the baseline dataset for each respective one of the plurality of HPCs; and where the means for collecting information representative of the side-channel attack dataset for each respective one of the plurality of HPCs: means for collecting information representative of the side-channel attack dataset for each respective one of the plurality of HPCs.

Example 36 may include elements of any of examples 31 through 35 where the means for detecting whether each of the plurality of HPCs demonstrates anomalous activity based on the deviation between the baseline dataset and the side-channel attack dataset for each respective one of the plurality of HPCs may include: means for converting the baseline dataset for each respective one of the plurality of HPCs from a time domain to a time/frequency domain; and means for converting the side-channel attack dataset for each respective one of the plurality of HPCs from the time domain to the time/frequency domain.

Example 37 may include elements of any of examples 31 through 36 where the means for converting the baseline dataset for each respective one of the plurality of HPCs from the time domain to the time/frequency domain, may include: means for converting, via a Haar wavelet transform, the baseline dataset for each respective one of the plurality of HPCs from the time domain to the time/frequency domain.

Example 38 may include elements of any of examples 31 through 37, and the system may additionally include: means for generating an output signal that includes data indicative of the side-channel attack detection HPC sub-set; and means for communicating the output signal to one or more external processor-based devices.

According to example 40 there is provided an electronic device. The electronic device may include: a printed circuit board; processor circuitry coupled to the printed circuit board; a plurality of HPCs coupled to the processor circuitry; input/output interface circuitry; and a side-channel attack detection system that includes: hardware performance anomaly detection circuitry; and at least one storage device that includes machine-executable instructions that, when executed by the hardware performance anomaly detection circuitry, cause the hardware performance anomaly detection circuitry to: collect information representative of a side-channel attack dataset for each respective one of a plurality of HPCs as the processor circuitry executes at least one side channel attack detection instruction set; detect whether each of the plurality of HPCs demonstrates anomalous activity as the processor circuitry executes the at least one side-channel attack instruction set; and select the at least one HPC for inclusion in a side-channel attack detection HPC sub-set based on the demonstrated anomalous activity of the respective at least one HPC.

Example 41 may include elements of example 40 where the machine-executable instructions further cause the hardware performance anomaly detection circuitry to: collect information representative of a baseline dataset for each respective one of a plurality of HPCs as the processor circuitry executes at least one application instruction set.

Example 42 may include elements of any of examples 40 or 41 where the instructions that cause the hardware performance anomaly detection circuitry to collect information representative of a side-channel attack dataset for each respective one of a plurality of HPCs further cause the hardware performance anomaly detection circuitry to: collect information representative of a side-channel attack dataset for each respective one of a plurality of HPCs as the processor circuitry contemporaneously executes at least one side channel attack detection instruction set and the at least one application instruction set.

Example 43 may include elements of any of examples 40 through 42 where the hardware performance anomaly detection circuitry includes data collection circuitry; where the machine executable instructions that cause the hardware performance anomaly detection circuitry to collect information representative of a side-channel attack dataset for each respective one of a plurality of HPCs as the processor circuitry contemporaneously executes at least one side channel attack detection instruction set and the at least one application instruction set, cause the data collection circuitry to: collect information representative of the side-channel attack dataset for each respective one of a plurality of HPCs as the processor circuitry contemporaneously executes the at least one side channel attack detection instruction set and the at least one application instruction set; and where the machine executable instructions that cause the hardware performance anomaly detection circuitry to collect information representative of a baseline dataset for each respective one of a plurality of HPCs as the processor circuitry executes at least one application instruction set, cause the data collection circuitry to: collect information representative of a baseline dataset for each respective one of a plurality of HPCs as the processor circuitry executes at least one application instruction set.

Example 44 may include elements of any of examples 40 through 43 where the hardware performance anomaly detection circuitry includes time series feature extraction circuitry; where the machine executable instructions that cause the hardware performance anomaly detection circuitry to detect whether each of the plurality of HPCs demonstrates anomalous activity as the processor circuitry executes the at least one side-channel attack instruction set, cause the time series feature extraction circuitry to: convert the baseline dataset from each of the plurality of HPCs from a time domain to a time/frequency domain; and convert the side-channel attack dataset from each of the plurality of HPCs from the time domain to the time/frequency domain.

Example 45 may include elements of any of examples 40 through 44 where the time feature extraction circuitry comprises Haar wavelet transform circuitry.

Example 46 may include elements of any of examples 40 through 45 where the hardware performance anomaly detection circuitry includes anomaly detection circuitry; where the machine executable instructions that cause the hardware performance anomaly detection circuitry to detect whether each of the plurality of HPCs demonstrates anomalous activity based on the deviation between the baseline dataset and the side-channel attack dataset for each respective one of the plurality of HPCs, cause the anomaly detection circuitry to: detect whether each of the plurality of HPCs demonstrates anomalous activity based on the deviation between the baseline dataset and the side-channel attack dataset for each respective one of the plurality of HPCs.

Example 47 may include elements of any of examples 40 through 46 where the anomaly detection circuitry may include: one-class support vector anomaly detection circuitry.

Example 48 may include elements of any of examples 40 through 47 where the hardware performance anomaly detection circuitry includes hardware performance counter identification circuitry; where the machine executable instructions that cause the hardware performance anomaly detection circuitry to detect whether each of the plurality of HPCs demonstrates anomalous activity based on the deviation between the baseline dataset and the side-channel attack dataset for each respective one of the plurality of HPCs, cause the hardware performance counter identification circuitry to: detect, for each of the plurality of HPCs, whether each of the plurality of HPCs demonstrates anomalous activity based on the deviation between the baseline dataset and the side-channel attack dataset for each respective one of the plurality of HPCs; and select the at least one HPC for inclusion in a side-channel attack detection HPC sub-set based on the demonstrated anomalous activity of the respective at least one HPC.

Example 49 may include elements of any of examples 40 through 48, and the electronic device may additionally include: input/output (I/O) interface circuitry; where the at least one storage device further includes machine-executable instructions that, when executed by the processor circuitry, cause the processor circuitry to: generate an output signal that includes data indicative of the side-channel attack detection HPC sub-set; and communicate the output signal to one or more external processor-based devices.

According to example 50, there is provided a system for detecting a side-channel attack using hardware counter anomaly detection circuitry, the system being arranged to perform the method of any of examples 11 through 20.

According to example 51, there is provided a chipset arranged to perform the method of any of examples 11 through 20.

According to example 52, there is provided at least one non-transitory machine readable medium comprising a plurality of instructions that, in response to be being executed on a processor-based device, cause the computing device to carry out the method according to any of examples 11 through 20.

According to example 53, there is provided a device configured for detecting a side-channel attack using hardware counter anomaly detection circuitry, the device being arranged to perform the method of any of the examples 11 through 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A side-channel attack detection system comprising:
a plurality of hardware performance counters (HPCs) to be coupled to processor circuitry;
hardware performance anomaly detection circuitry to:
as the processor circuitry executes at least one side-channel attack detection instruction set:
collect information representative of a side-channel attack dataset for each of the plurality of HPCs;
detect, based on the information, whether said each of the plurality of HPCs demonstrates anomalous activity in response to a side-channel attack;
select at least one HPC of the plurality of HPCs for inclusion in a side-channel attack detection HPC subset based on a reliability of anomalous activity of the at least one HPC; and
cause communication to one or more processor-based devices external to the side-channel attack detection system data indicative of the HPC sub-set, the data indicative of the HPC sub-set to be used by the one or more devices to detect a side-channel attack using HPC data collected from only the HPC sub-set.

2. The side-channel attack detection system of claim 1, the hardware performance anomaly detection circuitry to further:
collect information representative of a baseline dataset for each of a plurality of HPCs as the processor circuitry executes at least one application instruction set.

3. The side-channel attack detection system of claim 2, the hardware performance anomaly detection circuitry to further:
collect information representative of a side-channel attack dataset for each of a plurality of HPCs as the processor circuitry contemporaneously executes at least one side-channel attack detection instruction set and the at least one application instruction set.

4. The side-channel attack detection system of claim 3, wherein the hardware performance anomaly detection circuitry includes data collection circuitry to:
collect information representative of the side-channel attack dataset for each of the plurality of HPCs as the processor circuitry contemporaneously executes the at least one side-channel attack detection instruction set and the at least one application instruction set; and
collect information representative of a baseline dataset for each of the plurality of HPCs as the processor circuitry executes at least one application instruction set.

5. The side-channel attack detection system of claim 4, wherein the hardware performance anomaly detection circuitry includes time series feature extraction circuitry to:
convert the baseline dataset from each of the plurality of HPCs from a time domain to a time/frequency domain; and
convert the side-channel attack dataset for each of the plurality of HPCs from the time domain to the time/frequency domain.

6. The side-channel attack detection system of claim 3, wherein the time feature extraction circuitry comprises Haar wavelet transform circuitry.

7. The side-channel attack detection system of claim 4, wherein the hardware performance anomaly detection circuitry includes anomaly detection circuitry to:
detect whether said each of the plurality of HPCs demonstrates anomalous activity based on a deviation between the baseline dataset and the side-channel attack dataset for each of the plurality of HPCs.

8. The side: channel attack detection system of claim 5, wherein the anomaly detection circuitry comprises:
one-class support vector anomaly detection circuitry.

9. The side-channel attack detection system of claim 5, wherein the hardware performance anomaly detection circuitry includes hardware performance counter identification circuitry to:
detect whether each of the plurality of HPCs demonstrates anomalous activity based on the deviation between the baseline dataset and the side-channel attack dataset for each of the plurality of HPCs.

10. The side-channel attack detection system of claim 1, further comprising the processor circuitry and input/output (I/O) interface circuitry, wherein the processor circuitry is to:
generate an output signal that includes the data indicative of the HPC sub-set; and
communicate the data indicative of the HPC sub-set by sending the output signal to the one or more external devices using the I/O interface circuitry.

11. A side-channel attack detection method, comprising: as a processor circuitry executes at least one side-channel attack instruction set:
collecting; by hardware performance anomaly detection circuitry coupled to the processor circuitry, information representative of a side-channel attack dataset for each of a plurality of hardware performance counters (HPCs); and
detecting, based on the information and by the hardware performance anomaly detection circuitry, whether said each of the plurality of HPCs demonstrates anomalous activity in response to a side-channel attack;
selecting, by the hardware performance anomaly detection circuitry, at least one HPC of the plurality of HPCs for inclusion in a side-channel attack detection HPC sub-set based on a reliability of anomalous activity of the at least one HPC; and
causing communication to one or more processor-based devices external to the side-channel attack detection system data indicative of the HPC sub-set, the data indicative of the HPC sub-set to be used by the one or more devices to detect a side-channel attack using HPC data collected from only the HPC sub-set.

12. The side-channel-attack detection method of claim 11, further comprising:
collecting, via the hardware performance anomaly detection circuitry and as the processor circuitry executes at least one application instruction set, information representative of a baseline dataset for each of a plurality of HPCs.

13. The side-channel attack detection method of claim 12, wherein collecting information representative of a side-channel attack dataset for each of a plurality of HPCs further comprises:
collecting, by the hardware performance anomaly detection circuitry, information representative of a side-channel attack dataset for each of a plurality of HPCs as the processor circuitry contemporaneously executes the at least one side-channel attack instruction set and the at least one application instruction set.

14. The side-channel attack detection method of claim 13, wherein detecting whether each of the plurality of HPCs demonstrates anomalous activity as the processor circuitry executes the at least one side-channel attack instruction set further comprises:
detecting, by the hardware performance anomaly detection circuitry, whether each of the plurality of HPCs demonstrates anomalous activity based on a deviation between the baseline dataset and the side-channel attack dataset for each of the plurality of HPCs.

15. The side-channel-attack detection method of claim 12, wherein collecting information representative of the baseline dataset for each of the plurality of HPCs comprises:
collecting, via data collection circuitry disposed in the hardware performance anomaly detection circuitry, the information representative of the baseline dataset for each of the plurality of HPCs; and
wherein collecting information representative of the side-channel attack dataset for each of the plurality of HPCs includes:
collecting, by the data collection circuitry, information representative of the side-channel attack dataset for each of the plurality of HPCs.

16. The side-channel-attack detection method of claim 15, wherein detecting whether each of the plurality of HPCs demonstrates anomalous activity based on the deviation between the baseline dataset and the side-channel attack dataset for each of the plurality of HPCs further comprises:
causing, by time series feature extraction circuitry disposed in the hardware performance anomaly detection circuitry, a conversion of the baseline dataset for each of the plurality of HPCs from a time domain to a time/frequency domain; and
causing, by the time series feature extraction circuitry, a conversion of the side-channel attack dataset for each of the plurality of HPCs from the time domain to the time/frequency domain.

17. The side-channel-attack detection method of claim 16, wherein causing the conversion of the baseline dataset for each of the plurality of HPCs from the time domain to the time/frequency domain, further comprises:
causing, by Haar wavelet transform circuitry included in the time series feature extraction circuitry disposed in the hardware performance anomaly detection circuitry, the conversion of the baseline dataset for each of the plurality of HPCs from the time domain to the time/frequency domain.

18. The side-channel-attack detection method of claim 16, wherein detecting whether each of the plurality of HPCs demonstrates anomalous activity based on the deviation between the baseline dataset and the side-channel attack dataset for each of the plurality of HPCs further comprises:
detecting, by anomaly detection circuitry disposed in the hardware performance anomaly detection circuitry, whether each of the plurality of HPCs demonstrates anomalous activity based on the deviation between the baseline dataset and the side-channel attack dataset for each of the plurality of HPCs.

19. The side-channel-attack detection method of claim 18, wherein detecting whether each of the plurality of HPCs demonstrates anomalous activity based on the deviation between the baseline dataset and the side-channel attack dataset for each of the plurality of HPCs further comprises:
detecting, by one-class support vector anomaly detection circuitry disposed in the hardware performance anomaly detection circuitry, whether each of the plurality of HPCs demonstrates anomalous activity based on the deviation between the baseline dataset and the side-channel attack dataset for each of the plurality of HPCs.

20. The side-channel-attack detection method of claim 11, further comprising:
generating, by the processor circuitry, an output signal that includes the data indicative of the side-channel attack detection HPC sub-set; and
communicating, via input/output circuitry coupled to the processor circuitry, the output signal to the one or more external processor-based devices.

21. A non-transitory machine-readable storage medium that includes machine-executable instructions that, when executed by hardware performance anomaly detection circuitry coupled to processor circuitry, cause the hardware performance anomaly detection circuitry to:

collect information representative of a side-channel attack dataset for each of a plurality of hardware performance counters (HPCs) responsive to execution of at least one side-channel attack instruction set by the processor circuitry;

detect, based on the information, whether each of the plurality of HPCs demonstrates anomalous activity in response to the side-channel attack as the processor circuitry executes the at least one side-channel attack instruction set;

select at least one HPC of the plurality of HPCs for inclusion in a side-channel attack detection HPC sub-set based on a reliability of anomalous activity of the at least one HPC; and cause communication to one or more processor-based devices external to the side-channel attack detection system data indicative of the HPC sub-set, the data indicative of the HPC sub-set to be used by the one or more devices to detect a side-channel attack using HPC data collected from only the HPC sub-set.

22. The non-transitory machine-readable storage medium of claim 21, wherein the instructions, when executed by the hardware performance anomaly detection circuitry coupled to processor circuitry, further cause the hardware performance anomaly detection circuitry to:

collect information representative of a baseline dataset for each of the plurality of HPCs responsive to execution of at least one application instruction set by the processor circuitry.

23. The non-transitory machine-readable storage medium of claim 22, wherein the instructions, when executed by the hardware performance anomaly detection circuitry coupled to processor circuitry, further cause the hardware performance anomaly detection circuitry to:

collect information representative of a side-channel attack dataset for each of a plurality of HPCs responsive to a contemporaneous execution of the at least one side-channel attack instruction set and the at least one application instruction set by the processor circuitry.

24. The non-transitory machine-readable storage medium of claim 23, wherein the instructions, when executed by the hardware performance anomaly detection circuitry coupled to processor circuitry, further cause the hardware performance anomaly detection circuitry to:

detect whether each of the plurality of HPCs demonstrates anomalous activity based on a deviation between the baseline dataset and the side-channel attack dataset for each of the plurality of HPCs.

25. An electronic device, comprising:

a printed circuit board;

processor circuitry coupled to the printed circuit board;

a plurality of hardware performance counters (HPCs) coupled to the processor circuitry;

input/output interface circuitry; and a side-channel attack detection system that includes hardware performance anomaly detection circuitry to:

collect information representative of a side-channel attack dataset for each of the plurality of HPCs as the processor circuitry executes at least one side-channel attack detection instruction set;

detect, based on the information, whether each of the plurality of HPCs demonstrates anomalous activity in response to a side-channel attack as the processor circuitry executes the at least one side-channel attack instruction set;

select the at least one HPC of the plurality of HPCs for inclusion in a side-channel attack detection HPC sub-set based on a reliability of anomalous activity of the respective at least one HPC; and cause communication to one or more processor-based devices external to the side-channel attack detection system data indicative of the HPC sub-set, the data indicative of the HPC sub-set to be used by the one or more devices to detect a side-channel attack using HPC data collected from only the HPC sub-set.

\* \* \* \* \*